US012735944B2

(12) United States Patent
Batiste

(10) Patent No.: US 12,735,944 B2
(45) Date of Patent: Sep. 15, 2026

(54) LADDER MULTI-SURFACE STABILIZER SYSTEM AND METHOD

(71) Applicant: Caleb Batiste, Lacombe, LA (US)

(72) Inventor: Caleb Batiste, Lacombe, LA (US)

( * ) Notice: Subject to any disclaimer, the term of this patent is extended or adjusted under 35 U.S.C. 154(b) by 133 days.

(21) Appl. No.: 18/978,532

(22) Filed: Dec. 12, 2024

(65) Prior Publication Data

US 2026/0071494 A1 Mar. 12, 2026

Related U.S. Application Data

(63) Continuation-in-part of application No. 18/830,930, filed on Sep. 11, 2024.

(51) Int. Cl.
*E06C 7/46* (2006.01)
*E06C 7/42* (2006.01)

(52) U.S. Cl.
CPC ................ *E06C 7/46* (2013.01); *E06C 7/423* (2013.01)

(58) Field of Classification Search
CPC ... E06C 7/46; E06C 7/423; E06C 7/42; E06C 7/00; E06C 5/02
USPC .......................................... 182/108, 109, 39
See application file for complete search history.

(56) References Cited

U.S. PATENT DOCUMENTS 1,304,018 A 5/1919 Brown
1,455,002 A 5/1923 Henshaw
1,494,692 A 5/1924 Lohlker
1,570,564 A 1/1926 Hamel
1,597,786 A 8/1926 Hamel
1,651,863 A 12/1927 Baur
1,862,171 A 6/1932 Baker
1,909,620 A 5/1933 Lang
2,143,783 A 1/1939 Liebman
(Continued)

FOREIGN PATENT DOCUMENTS

CN 111005670 4/2020
GB 2158499 11/1985
(Continued)

*Primary Examiner* — Zoe Tam Tran
(74) *Attorney, Agent, or Firm* — KEATY LAW FIRM LLC; Thomas S. Keaty

(57) ABSTRACT

A ladder multi-surface stabilizer system and method for removably securing a standard ladder on a variety of surfaces. Two rack bars, each providing a rack of teeth, are securely and removably mounted to rails or stringers of the ladder using two clamp units. Each rack bar provides a crossbar at the bottom of the rack bar which can be used for placement below standard bar-grate decking or can be used for secure and removable mounting to an anchor plate. Each anchor plate provides mounting holes for securely and removably mounting anchor units to the anchor plate. A variety of anchor units, such as spike anchors, suction anchors, and magnet anchors, are provided for use on different surfaces. In use, anchor units appropriate for the surface are mounted to the anchor plates, the crossbars of the rack bars are mounted to the anchor plates, the clamp units are mounted to the rails or stringers of the ladder, the rack bars are mounted to the clamp units, the rack bars are pulled upward and the force is maintained by the clamp units engaging the rack teeth of the rack bars, stabilizing the ladder for safe use. The ladder multi-surface stabilizer system can be provided as a kit.

13 Claims, 7 Drawing Sheets

(56) References Cited

U.S. PATENT DOCUMENTS

| | | | | |
|---|---|---|---|---|
| 2,145,619 | A | 1/1939 | Brown | |
| 2,177,677 | A * | 10/1939 | Staben | E06C 7/46 182/201 |
| 2,407,575 | A | 9/1946 | Ramsey | |
| 2,523,535 | A | 9/1950 | Little | |
| 2,760,706 | A | 8/1956 | Pearl | |
| 3,508,628 | A * | 4/1970 | Conrad | E06C 7/423 182/172 |
| 4,034,829 | A | 7/1977 | Hoffman | |
| 4,147,231 | A | 4/1979 | Chantler et al. | |
| 4,153,137 | A * | 5/1979 | Johnson | E06C 7/42 182/180.1 |
| 4,480,819 | A | 11/1984 | Lopez | |
| 4,836,331 | A * | 6/1989 | Foradori | E06C 7/46 182/201 |
| 4,899,847 | A | 2/1990 | Lufkin | |
| 4,941,547 | A | 7/1990 | Livick | |
| 5,054,579 | A | 10/1991 | Moson | |
| 5,222,575 | A * | 6/1993 | Santos | E06C 7/484 182/108 |
| 5,669,462 | A | 9/1997 | Jennings | |
| 5,704,451 | A | 1/1998 | King | |
| 6,547,036 | B1 | 4/2003 | Carter | |
| 6,595,326 | B1 * | 7/2003 | Dean | E06C 7/44 182/108 |
| 6,655,497 | B1 | 12/2003 | Weatherall | |
| 6,745,869 | B2 | 6/2004 | Garrett | |
| 8,042,651 | B1 * | 10/2011 | Michnik | E06C 7/426 182/108 |
| 9,010,490 | B1 | 4/2015 | Mosier | |
| 2005/0067224 | A1 | 3/2005 | Brewster | |
| 2005/0092551 | A1 | 5/2005 | Caldwell | |
| 2007/0193827 | A1 * | 8/2007 | Lambert | E06C 7/46 182/108 |
| 2008/0000720 | A1 | 1/2008 | Porch et al. | |
| 2008/0011549 | A1 | 1/2008 | Lott | |
| 2008/0029341 | A1 | 2/2008 | Cooper | |
| 2008/0156585 | A1 | 7/2008 | Pyktel et al. | |
| 2009/0200110 | A1 | 8/2009 | Esselborn | |
| 2010/0252645 | A1 | 10/2010 | Maurer et al. | |
| 2011/0132684 | A1 * | 6/2011 | Wilkins | E06C 7/46 182/107 |
| 2012/0199416 | A1 | 8/2012 | Hopkins et al. | |
| 2013/0048427 | A1 | 2/2013 | Sordo et al. | |
| 2014/0001333 | A1 * | 1/2014 | Stephen | E06C 7/46 248/530 |
| 2014/0138184 | A1 | 5/2014 | Hernandez | |
| 2014/0216850 | A1 | 8/2014 | Markley | |
| 2014/0231171 | A1 * | 8/2014 | Kerr | E06C 7/46 182/108 |
| 2016/0369563 | A1 | 12/2016 | Adcock et al. | |
| 2021/0198947 | A1 * | 7/2021 | Goudreault | E06C 7/423 |
| 2023/0021230 | A1 | 1/2023 | Santana | |

FOREIGN PATENT DOCUMENTS

| | | |
|---|---|---|
| KR | 200242382 | 10/2001 |
| KR | 20130001393 | 3/2013 |
| KR | 20130021057 | 3/2013 |
| KR | 20150000886 | 3/2015 |
| KR | 20190123629 | 11/2019 |
| KR | 102582621 | 9/2023 |

* cited by examiner

LADDER MULTI-SURFACE STABILIZER SYSTEM AND METHOD

CROSS-REFERENCE TO RELATED APPLICATION

This application is a continuation-in-part of co-pending application Ser. No. 18/830,930, filed on Sep. 11, 2024, the full disclosure of which is incorporated by reference herein and priority of which is hereby claimed.

BACKGROUND OF THE INVENTION

This invention provides a ladder multi-surface stabilizer system and method for removably securing a standard ladder on a variety of surfaces.

Ladders such as stepladders and extension ladders are used for many inspection, maintenance, emergency repair, and occasional access tasks which do not warrant the installation of a fixed ladder. Such ladders are usually purchased as standard stepladders and extension ladders that are generally available without any special features or safety provisions for heavy industrial or production work. Often the ladder will need to be set up in a busy or active area, presenting a risk of the ladder being jostled and persons on the ladder being injured. For different tasks and circumstances, the ladder might need to be set up on a variety of different surfaces such as bare ground, bar-grate decking, steel decking, or smooth interior or exterior paving or flooring.

It is sometimes necessary to place a ladder very close to or up against some object or structure, especially when, for instance, climbing up on top of a structure or building. Any stabilization device or structure which is bulky or cumbersome or extends past the footprint of the ladder might not allow for proper safe use with a ladder placed close to or against something. A fixed ladder can usually be permanently mounted in places and circumstances where frequent access is needed. Therefore, when a general-purpose ladder is used, it is likely to be used on an area normally used for movement back and forth or for other purposes. Also, the circumstances leading to the use of the ladder might involve some urgency and increased activity. Stabilization of the ladder is usually required, for good reason. But if a stabilization device is too bulky or cumbersome to be carried quickly, by hand, along with the ladder itself, in one trip, then the risk that no stabilization will be used, in an urgent situation, will be greatly increased. Even where a stabilization device is at hand in urgent conditions, if the installation of the device is complex or time-consuming, then the stabilization might be skipped or might be installed badly.

In circumstances where a ladder and a stabilizing device might need to be dispatched for use where the specific type of surface encountered is not known, it would be very beneficial to have access to a variety of anchoring methods appropriate to the variety of surfaces which might be encountered.

What is needed is a ladder multi-surface stabilizer which can secure a variety of ladders on a variety of surfaces, which can be set up and taken down quickly, easily, and correctly, and which can be stored and handled along with the ladder, ensuring availability when needed.

UK Publication No. 2 158 499 for a "Ladder Support Device," published on Nov. 13, 1985 by inventors Warren Anthony Talbot et al., discloses locating devices for preventing slippage of a ladder on a grating, grille, or like surface comprising a member for receiving the end of an upright of a ladder, and a member for engaging the surface. The end of the upright of the ladder is located in the receiving member by means of a screw arrangement. The member engages the grating by means of projections. The member can be connected to the member by means of a ball and socket arrangement. By utilizing a pair of devices, a ladder may be located at any desired inclination whereby the member will contact the member in the desired position.

Korean Patent No. 10-2582621 for an "Overturn Preventing Device for Ladder," issued on Sep. 20, 2023, provides for a ladder fall prevention device to prevent a ladder used in ship construction from falling. It is equipped with a fall prevention means to prevent a foldable ladder from falling, and the fall prevention means is installed in the middle of the first to fourth frames, respectively. A U-shaped connector, a first fall prevention connecting means whose both terminals are connected to the U-shaped connectors installed on the first frame and the third frame, and a second terminal whose both terminals are connected to the U-shaped connectors installed on the second frame and the fourth frame. A fall-prevention connecting means, a fall-prevention bar in which the first and second ring portions formed on the upper sides of both ends are respectively fastened to the middle of the first fall-prevention connecting means and the second fall-prevention connecting means, and a second ring formed on the lower side of both ends of the fall-prevention bar. An automatic bar belt passing through the third ring and the fourth ring, installed on one side of the automatic bar belt, an automatic bar handle that adjusts the length and tension, and formed at both ends of the automatic bar belt, respectively, and a folding ladder on the floor. By providing a configuration that includes an automatic bar ring with a fastening ring, it is possible to prevent the ladder from falling and work without restrictions due to location and space.

U.S. Pat. No. 6,745,869 for "ROOFMATES™ Roofing Accessories," issued on Jun. 8, 2024 to assignee Roofmates, Incorporated, provides for a number of roofing accessories, including a lightweight adjustable ladder and scaffold support. The scaffold support is provided with a pair of rails spaced the standard spacing of most roof joists. Connected to the rails through suitable holes and slots, are rods supporting an adjustable platform. One of the rods may be placed through a corresponding slot to achieve a suitable angle of adjustment corresponding to roof incline. An apparatus is also provided for supporting loads of materials or supplies on an inclined roof, using components and parts in common with the scaffold support, or components and parts similar thereto. A tool tray is provided which may be backed with a layer of foam to prevent the tray from slipping off the roof, while allowing the tray to be freely moved along and up and down the roof, as work progresses.

U.S. Pat. No. 1,862,171 for a "Ladder Shoe," issued on Jun. 7, 1932 to inventor Walter James Baker, provides for "ladder shoes" or adjustable extensions for ladders to enable workmen or others to conveniently set up a ladder upon a sloping ground or other surface.

US Publication No. 2012/0199416 for a "Ladder Stabilizer," published on Aug. 9, 2012 by inventors Raymond Hopkins et al., discloses a ladder stabilizer having a base plate that engages with a lower portion of the ladder and having a tire receiving portion at an end portion of the base plate. The weight of a vehicle tire on the tire receiving portion provides increased stability to the base plate of the ladder stabilizer. The tire receiving portion can be moved to either side of the base plate and can have a base plate-engaging mechanism on its bottom surface to couple with a mating surface of the base plate. The ladder can be retained by a leg retainer, rung retainer, or other retaining member that is coupled to a ladder retainer attachment portion of the base plate. Preferably, the ladder retainer mechanism includes some type of fastener or tensioning mechanism to secure the lower portion of the ladder to the base plate.

U.S. Pat. No. 6,655,497 for a "Stabilizer for Ladders," issued on Dec. 2, 2003 to inventor Barrie Weatherall, provides for a stabilizer for ladders, where the stabilizer comprises a rigid, generally flat base having a linear channel extending along a first, upper surface thereof, which channel is defined by a pair of generally parallel, upwardly-extending side members having upper edges directed towards each other, and at least one ladder attachment by means of which a ladder stile may be extended downwardly.

U.S. Pat. No. 5,704,451 for a "Ladder Stabilizing System," issued on Jan. 6, 1998 to inventor Steven L. King, provides for a ladder stabilizing system including a pair of mounting assemblies coupled to a lower end of a ladder. Further provided are a pair of stabilizing mechanisms slidably engaged with respect to the mounting assemblies. A pair of feet are pivotally coupled to an associated stabilizing mechanism at a lower end thereof. The feet are adapted to pivot within a plane common to a plane defined by the vertical members of the ladder. Also included is a ladder shoe accessory comprising an elongated member having a rectangular configuration with a lower face and an upper face with a pair of elongated side faces integrally coupled between side edges of the lower face and upper face thereby defining an elongated slot. The upper face further has an elongated slit formed therein and extended between a pair of open ends of the ladder shoe accessory. The feet are adapted to be situated within the elongated slot of the first shoe accessory. Further provided is at least one stabilizer control mechanism for allowing a user to dictate the extent to which the stabilizing mechanisms extend below the ladder.

U.S. Pat. No. 4,480,819 for an "Attachable/Detachable Railing Device," issued on Nov. 6, 1984 to inventor Keith Lopez, provides for a protective railing device having posts for supporting a barrier means and with the posts having foot portions that are attachable to the grating of an offshore platform.

U.S. Pat. No. 1,651,863 for a "Ladder Jack," issued on Dec. 6, 1927 to inventor Mathieu J. Baur, provides for a removable, adjustable ladder jack to support a ladder on a flat or an inclined base.

U.S. Pat. No. 6,547,036 for a "Ladder Leg Support Apparatus," issued on Apr. 15, 2003 to inventor Boyce N. Carter, provides for a ladder leg support apparatus that includes a support member having upstanding inner side and back walls and inclined outer side and back walls. Flanges selectively positioned along the inner side walls support a plate at a selected height for supporting a ladder leg thereon. An auxiliary side panel is pivotally coupled to an outer side wall and may be extended and supported with a support leg to provide stability when the support member is positioned on a stair. The apparatus further includes a platform having a support surface on which the support member may be positioned. The platform includes threaded leg assemblies which may be extended to a downwardly adjacent stair to support the platform on a selected stair. The platform includes at least one sight level for verifying the proper support leg length adjustment.

US Publication No. 2014/0138184 for a "Secure Foot Ladder," published on May 22, 2014 by inventor Nabor Hernandez, discloses a secure foot ladder comprising a ladder, where the ladder includes a pair of side rails, a plurality of rungs between the rails, and a pair of feet attached to a bottom of each rail; a plurality of spikes positioned within each foot, where the plurality of spikes extend from a bottom of each foot to engage the ground; and an actuator within the side rails, where the actuator extends and retracts the plurality of spikes. The spikes'length depends on the type of surface upon which the ladder is placed, where a long spike is used on soft surfaces and a short spike or no spikes are used on a hard surface.

U.S. Pat. No. 5,054,579 for a "Ladder Having an Anchoring System," issued on Oct. 8, 1991 to inventor John A. Moson, provides for a ladder having an anchoring system, including a ladder and stakes to be driven into the ground which are engageable against an upwardly facing surface of the ladder in the normal position of use. According to preferred embodiments, the ladder is provided with a pair of apertures either in the lower most rung, the side rails or in laterally extending flanges through which the anchoring stakes are received.

U.S. Pat. No. 4,941,547 for "Safety Featured Ladder Scaffolding," issued on Jul. 17, 1990 to inventor Lester R. Livick, provides for a wall scaffold using a pair of ladders equipped with ladder jacks for supporting a horizontal work platform. The scaffold includes safety features such as a safety railing on standards attached to the outboard ends of the ladder jacks, a paint bucket trolley for the railing, an adjustable anti-flexing brace between the central part of the ladder and the wall to prevent bouncing of the ladder and platform, a safety clamp for tightly securing components to the ladder rungs, a ladder level adjuster, an auxiliary step to assist in mounting and dismounting the work platform, and a safety stake attachable to the lowest ladder rung to prevent bottom "slip-out."

U.S. Pat. No. 4,899,847 for "Mobile Supports," issued on Feb. 13, 1990 to inventor Elmer S. Lufkin, provides for a mobile ladder that has two pairs of rollers. One pair of rollers moves in a first metal trough and the other pair moves in another metal trough. The metal trough are positioned close to a building wall, for example, and are in parallel relation to each other. The ladder can be moved in the troughs when a workman in on the ladder through use of a pulley system. Also provided is a mobile scaffold which has two pairs of rollers. One pair of rollers moves in a first metal trough and the other pair moves in another metal trough. The metal trough are positioned close to a building wall, for example, and are in parallel relation to each other. The scaffold can be moved in the troughs when a workman in on the scaffold through use of a pulley system. Further provided is a work bucket that is mounted to a ladder by a pair of bracket members. Lastly, provided is a work bucket assembly that is mounted to a ladder by a pair of bracket members engaged to a bar. The bar is attached to a pulley system which in turn is attached to a work bucket allowing the work bucket to be raised and lowered by a workman in the work bucket.

US Publication No. 2008/0029341 for "Ladder Stabilizing Attachments," published on Feb. 7, 2008 by inventor William Albert Cooper, discloses a ladder stabilizing attachment for a ladder. The device is made of two or more long variable length stabilizing attached to the upper part of a ladder by universal joints, and capable of forming a triangular or multi-angular pyramid with the ladder. The legs can be independently positioned to give greater lateral stability, as well reducing slide out tendency of the ladder base. The foot sockets of the stabilizing legs are designed to minimize overloading and movement due to ladder flexing. The device is constructed so that it can be built into new ladders, and readily adapted for and fitted to most existing ladders.

U.S. Pat. No. 5,669,462 for a “Ladder Leveling Apparatus,” issued on Sep. 23, 1997 to inventor Paul J. Jennings, provides for a level ladder and safety device for a ladder of the type having a pair of side rails with a plurality of connecting rungs. The device comprises a pair of slider members, each of which is sized to fit against one of the side rails of the ladder at a lower end thereof in an adjustable manner. A facility is for retaining each of the slider members to each of the side rails of the ladder, so that the ladder can stand upright in a stationary safe position upon an uneven terrain.

U.S. Pat. No. 166,883 for a “Ladder,” issued on Aug. 17, 1875 to inventor Abraham S. Miller, provides for a ladder constructed with an upright pole or standard, extensible in height, and supported on a base-beam resting at one end on the ground or on a stake driven therein, and at the other end adjustable on a standard, so that the ladder may be set firm on uneven ground.

U.S. Pat. No. 2,523,535 for an “Adjustable Ladder Anchor,” issued on Sep. 26, 1950 to inventor Warren E. Little, provides for a device for preventing the skidding of the foot or lower portion of a ladder away from a building or other structure against which it is leaned.

US Publication No. 2008/0000720 for a “Ladder Anchoring System,” published on Jan. 3, 2008 by inventors John Porch et al., discloses a ladder anchoring system for ladders with hollow bore ladder rungs, which includes: first and second vertical shafts each having a hollow bore disposed between opposite open ends; first and second elongated ladder securing members dimensioned to respectively slideably fit through the hollow bores of the first and second vertical shafts; and first and second horizontal members. The first and second horizontal members are attached in parallel and between the first and second vertical shafts. At least one of the first and second vertical shafts is detachable from the first and second horizontal members. An attachment means is provided for reversibly securing the first and second horizontal members to at least one of the first and second vertical shafts.

US Publication No. 2008/0011549 for a “System for Erecting Ladder Stand for Hunting,” published on Jan. 17, 2008 by inventor Chris Lott, discloses a system for erecting a ladder stand for hunting, where the system has a pivoting base assembly connected to a bottom end of a ladder, and a pair of support legs pivotally attached to respective sides of an upper section of the ladder. The pivoting base assembly includes first and second foot pad members, anchoring stakes for anchoring the foot pad members to the ground, a base frame pivotally connected to the foot pad members, and first and second receiver tubes connected to the base frame for receiving the bottom end of the ladder. The pivoting base assembly receives and anchors the bottom end of the ladder and allows the ladder to be easily moved from a horizontal position to an upright position. The support legs have ground pegs at their lower ends for engaging the ground to support the ladder stand in an intermediate position as the ladder stand is being erected.

U.S. Pat. No. 2,145,619 for an “Antislipping Attachment for Ladders,” issued on Jan. 31, 1939 to inventor Leon R. Brown, provides for a device for holding the lower end of a ladder against slipping when placed against a building or the like.

US Publication No. 2008/0156585 for a “Ladder Safety Mat,” published on Jul. 3, 2008 by inventors Shawn Pyktel et al., discloses a ladder safety mat for securing the base of a ladder to a supporting surface, the mat including a flexible body having a first surface and a second surface, the second surface providing a frictional resistance to the supporting surface; and two open vertical sockets located on the first surface and spaced apart from each other for accepting in each the lower end of a stile from the ladder, wherein the body and the vertical sockets are one molded piece. In another embodiment, the ladder safety mat includes a retaining ridge extending upward from the top surface of the ladder safety mat for retaining the lower ends of the stiles of the ladder. In yet another embodiment, the ladder safety mat includes recessed sockets for retaining the lower ends of the stiles of the ladder.

US Publication No. 2005/0067224 for a “Safety Support for Ladders,” published on Mar. 31, 2005 by inventor William Kevin Brewster, discloses a ladder safety support for use with an existing ladder. The support includes an attachment assembly for removable connection to the lower end of the ladder and one of two interchangeable foot assemblies for supporting the ladder on a surface. The first foot assembly provides a surface-penetrating stake having a lower tapered section and presenting a pointed tip and a threaded portion for removably attaching the stake to the assembly. The second foot assembly is similarly removable and provides a surface-engaging pad.

U.S. Pat. No. 4,034,829 for a “Step Stool,” issued on Jul. 12, 1977 to inventor Paul J. Hoffman, provides for a step stool including a handrail attached to one side with non-skid steps that make it safe when standing on the step stool. Stabilizing bars are connected to the step stool to prevent it from tipping over due to a user placing his weight on the hand rail when standing on the step stool.

US Publication No. 2009/0200110 for a “Ladder Anti-Slip Platform,” published on Aug. 13, 2009 by inventor Donald Esselborn, discloses a system of ladder accessories that enhance the resistance of an extension ladder from slipping on a wide range of support surfaces. The invention provides anti-slip surfaces for gripping to hard, granular, smooth, porous, non-porous, and irregular ladder supporting surfaces using light and easy to carry ladder accessories. The system also includes ladder stabilizers that reduce the horizontal forces acting upon the anti-slip surfaces for further resistance to slipping.

US Publication No. 2005/0092551 for a “Ladder Safe Base and Method for Utilization Thereof,” published on May 5, 2005 by inventor Mark J. Caldwell, discloses a coupling member for securing a ladder base end positionable against an unstable or uneven supporting surface. The coupling member includes a pair of receiving members disposed parallel and spaced apart for positioning the ladder base end thereupon and proximal of the supporting surface. A stabilizing cross-member extends between inner walls of the receiving members and is slidably adjustable in a width dimension to span a variety of ladder base widths. Outboard of each receiving member is disposed a side sleeve having an axially oriented channel therethrough in which a fixation member is slidably inserted to extend a contacting end against the supporting surface. Each fixation member is adjustable in height relative to respective side sleeves, thereby allowing the coupling member to be adjusted in a level orientation proximal the supporting surface with stabilization of the ladder base ends restrained in respective receiving members during load-bearing activity on the ladder.

U.S. Pat. No. 2,143,783 for a “Ladder,” issued on Jan. 10, 1939 to inventor Arno J. Liebman, provides for a ladder having anchorages at its upper ends which will engage the outer surfaces of an automobile or walls of a room, where the ladder is supported at its upper ends with, preferably, vacuum cups.

U.S. Pat. No. 1,597,786 for a "Ladder Foot," issued on Aug. 31, 1926 to inventor Joseph Lewis Hamel, provides for non-slipping feet that may be readily attached to and detached from the tops and bottoms of ladders.

U.S. Pat. No. 1,570,564 for a "Ladder Foot," issued on Jan. 19, 1926 to inventor Joseph Lewis Hamel, provides for a ground or wall gripping device which can be detachably secured to the tops and bottoms of ladders for anchoring them in position.

U.S. Pat. No. 1,455,002 for a "Ladder Foot," issued on May 15, 1923 to assignee Thomas Henshaw, provides for a device to anchor and secure ladders, scaffolding poles, or the like, where the device comprises of a combination of a pair of metallic members, a suction pad, and an adjustable connection between the metallic members.

U.S. Pat. No. 1,304,018 for an "Antislipping Ladder Attachment," issued on May 20, 1919 to inventor Charles J. Brown, provides for an anti-skidding attachment or means to a lower end of a ladder, where the attachment comprises of, among other things, a suction cup to aid in holding the ladder stationary.

US Publication No. 2013/0048427 for a "Portable Ladder," published on Feb. 28, 2013 by applicants Pietro Sordo et al., discloses a portable ladder having at the base end of at least one of the uprights thereof a plurality of sucker elements, adapted to adhere strongly to the ground following the formation of vacuum beneath the elements. The ladder has at the base of the at least one upright a structure, which includes a cap, at the concave surface of the cap facing towards the surface on which the ladder rests there is fixed the plurality of sucker elements.

U.S. Pat. No. 1,494,692 for a "Ladder and Trestle Shoe," issued on May 20, 1924 to inventor William A. Lohlker, provides for a non-slipping shoe for a step-ladder leg, comprising an elastic upper and an oblong sole which is provided on its bottom with a row of cup-like rings.

U.S. Pat. No. 2,760,706 for an "Extension Ladder," issued on Aug. 28, 1956 to assignee Scranton Aluminum Manufacturing, Co., provides for an extension ladder formed of a series of slidably connected together ladder sections, including a lower ladder section comprising of an anti-slip rubber cushion member having suction cups, among other things. Further provided is a means for locking the sections together in extended position.

U.S. Pat. No. 2,407,575 for a "Ladder Support," issued on Sep. 10, 1946 to inventor Joseph D. Ramsey, provides for a ladder support to maintain a ladder in an inclined position, where the support comprises of a hollow suspension block and a gripper member.

U.S. Pat. No. 1,909,620 for a "Gripping Device for Ladders," issued on May 16, 1933 to inventor Henry W. Lang, provides for pads to be attached to a lower end of a ladder to prevent slipping.

Korean Publication No. 2019-0123629 for an "Overturn Preventing Device for Ladder," published on Nov. 1, 2019, discloses a ladder falling prevention device to prevent a ladder from falling down used when building a ship. The ladder falling prevention device includes a falling prevention means to prevent a foldable ladder from falling down. The falling prevention means includes: a U-shaped connector installed on centers of a first to a fourth frame; a first falling prevention connection means wherein both terminals thereof are connected to the U-shaped connector installed on the first frame and the third frame; a second falling prevention connection means wherein both terminals thereof are connected to the U-shaped connector installed on the second frame and the fourth frame; a falling prevention bar wherein a first and a second ring unit formed on an upper side of both ends thereof are coupled to centers of the first and the second falling prevention connection means; an automatic bar belt penetrating a third and a fourth ring unit formed on a lower side of both ends of the falling prevention bar; an automatic bar handle which is installed on one side of the automatic bar belt, and adjusts a length and tension; and an automatic bar ring unit formed on both ends of the automatic bar belt, and provided with a ring to fix the foldable ladder on a floor. A ladder is prevented from falling down, and work can be performed without limitations on place and space.

Korean Patent No. 20-0242382 for a "Ladder for Ship's Work," issued on Oct. 15, 2001, provides for a ladder for ship work to improve the work efficiency by allowing the stable installation of the ladder in all kinds of block work by using a magnet.

Korean Publication No. 2013-0021057 for a "Jig for Ladder," published on Mar. 5, 2013, discloses a ladder jig for fixing a position of the ladder by using a latch and a magnet.

Korean Publication No. 2013-0001393 for a "Ladder Having Safety Magnet," published on Mar. 5, 2013, discloses a ladder provided with a safety magnet.

Korean Publication No. 2015-0000886 for a "Ladder for Heights Work," published on Mar. 3, 2015, discloses a ladder for a high-altitude working work.

Chinese Publication No. 111005670 for "Combined Type Climbing Tool for Straight Bulkhead of Cargo Hold," published on Apr. 14, 2020, discloses a combined climbing tool for a straight bulkhead of a cargo hold.

U.S. Pat. No. 9,010,490 for a "Ladder Stabilizing Apparatus," issued on Apr. 21, 2015 to applicant Ladder Safety Magnet, LLC, provides for an apparatus to secure a ladder to a ferromagnetic work surface, such as a metal storage tank, where the apparatus comprises a pair of brackets removably attached near the top of the ladder. The brackets are hinged to magnet mounts, which each hold a permanent magnet that releasably holds the ladder in place against the work surface. The apparatus prevents the ladder from slipping while a worker is climbing the ladder or while working from the ladder.

US Publication No. 2014/0216850 for a "Mount System," published on Aug. 7, 2014 by inventor Martin Joseph Markley, discloses a mount system including two different friction enhancing surfaces that attach to at least one leg of a support structure and form a stable surface area for inhibiting movement by the leg. A mount joins with a terminal end of the leg. The mount includes a first surface having at least one protrusion configured to penetrate the ground surface. The mount also includes a second surface having a frictional surface. The surfaces are reversible, whereby either the first or second surface engages the ground surface depending on the type of ground surface. The mount has a larger surface area than the terminal end to provide additional frictional forces for inhibiting movement of the support structure. A bracket overlays the mount and engages the terminal end. A fastener, such as a quarter turn cam lock enables efficient and fast removal of the bracket for reversing the surfaces.

SUMMARY OF THE INVENTION

This invention provides a ladder multi-surface stabilizer system and method for removably securing a standard ladder on a variety of surfaces.

Two rack bars, each providing a rack of teeth, are securely and removably mounted to rails or stringers of the ladder using two clamp units. Each rack bar provides a crossbar at the bottom of the rack bar which can be used for placement below standard bar-grate decking or can be used for secure and removable mounting to an anchor plate. Each anchor plate provides mounting holes for securely and removably mounting anchor units to the anchor plate. A variety of anchor units, such as spike anchors, suction anchors, and magnet anchors, are provided for use on different surfaces. In use, anchor units appropriate for the surface are mounted to the anchor plates, the crossbars of the rack bars are mounted to the anchor plates, the clamp units are mounted to the rails or stringers of the ladder, the rack bars are mounted to the clamp units, the rack bars are pulled upward and the force is maintained by the clamp units engaging the rack teeth of the rack bars, stabilizing the ladder for safe use. The ladder multi-surface stabilizer system can be provided as a kit.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
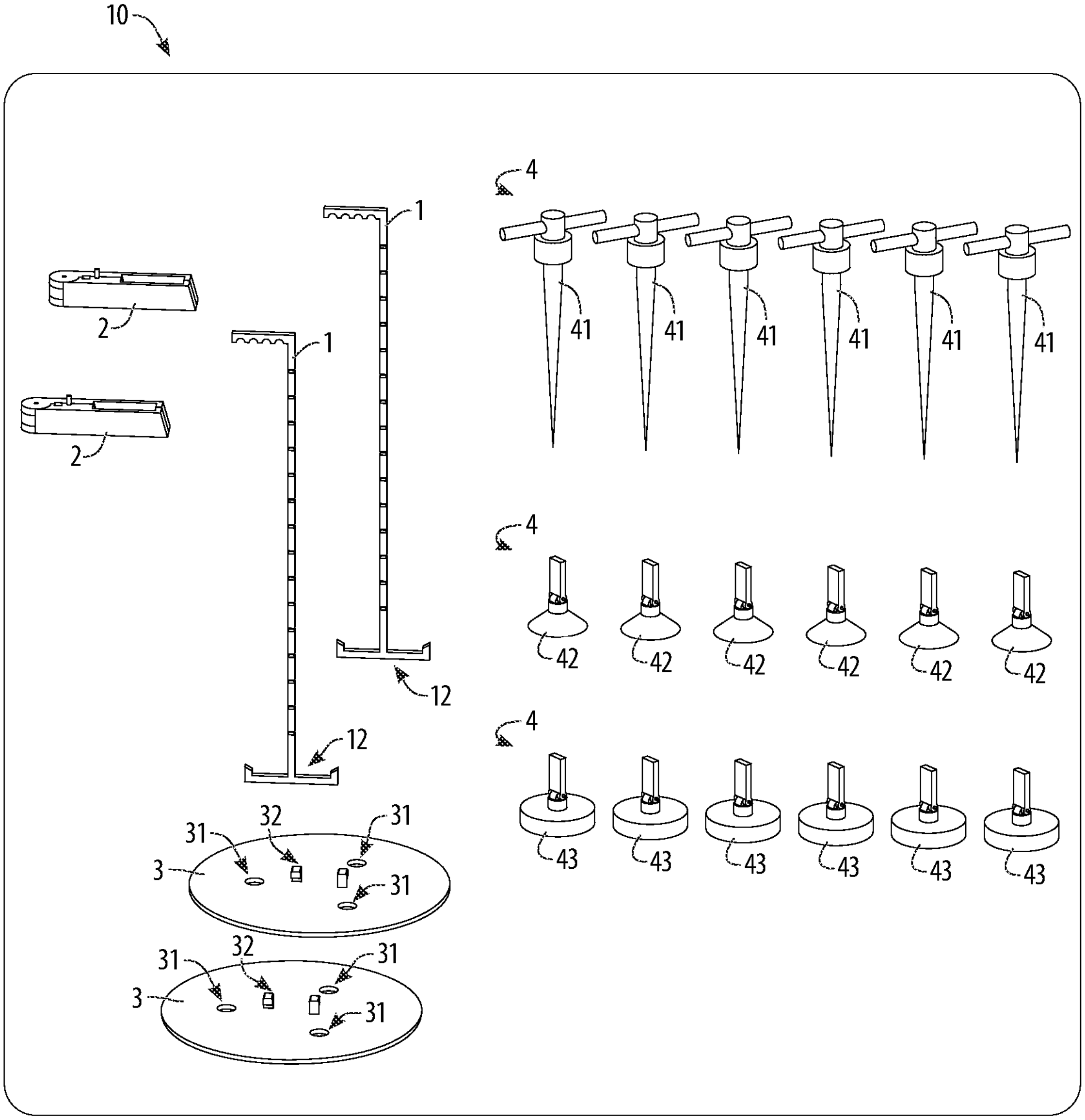
FIG. 1 is a schematic view of the ladder multi-surface stabilizer of the invention organized as a kit.
Figure 2:
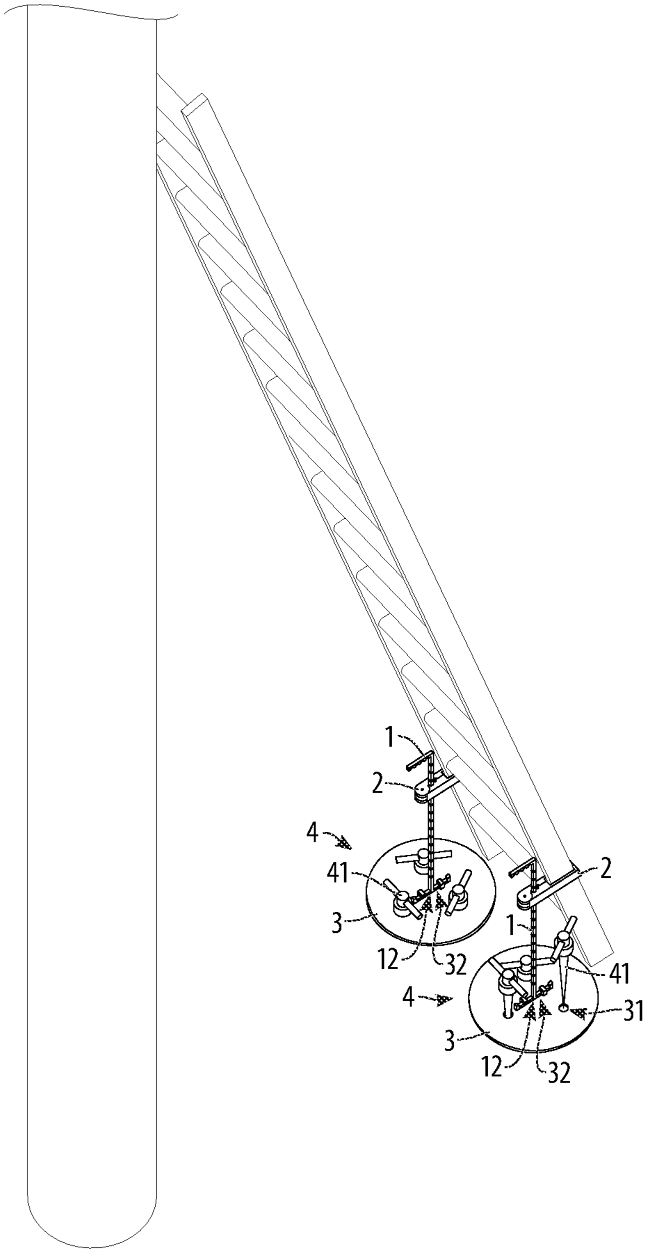
FIG. 2 is a perspective view of the ladder multi-surface stabilizer of the invention in use on a bare ground surface and using spike anchors.

Referring to FIG. 1 and FIG. 2, the ladder multi-surface stabilizer 10 system and method easily and removably secures a standard ladder on a variety of surfaces including the bare ground and multiple types of exterior and interior paving, flooring, and decking. Two rack bars 1 are securely and removably mounted to rails or stringers of the ladder using two clamp units 2. Each rack bar 1 has a vertical top-to-bottom orientation in use and provides a rack of teeth along the vertical bar. Each rack bar 1 provides a crossbar 12 at the bottom of the rack bar 1. The rack bar 1 can be made of steel or of a similar material. Although the use of only a single rack bar 1 and clamp unit 2 on only one rail or stringer of the ladder would provide at least some added stability, some potential for rotational instability of the unbraced ladder rail would remain, and the use of two rack bars 1 and clamp units 2 provides significantly more stability and is preferred.

Figure 3:
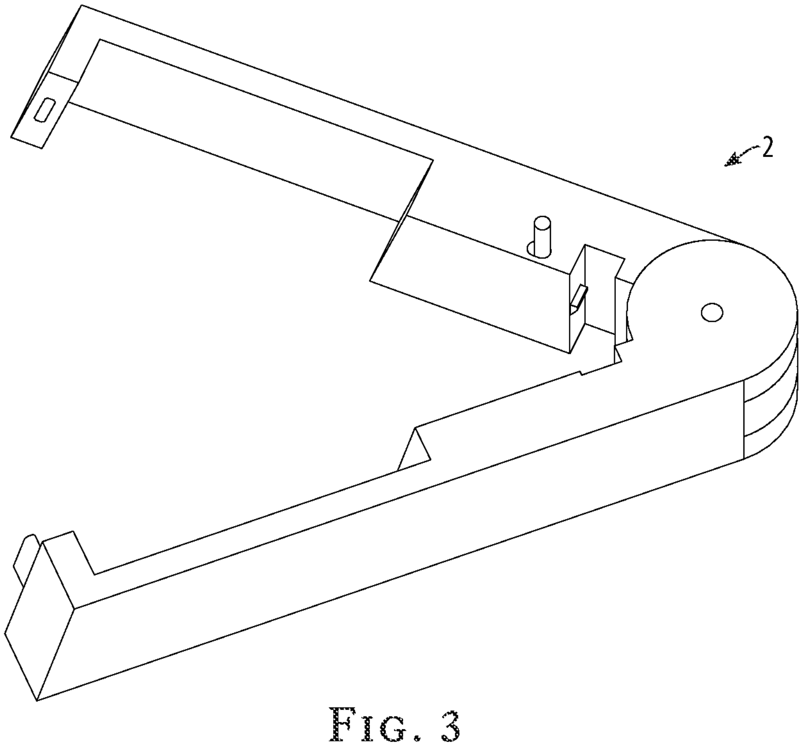
FIG. 3 is a perspective view of the clamp unit of the ladder multi-surface stabilizer of the invention, open with the pawl extended.
Figure 4:
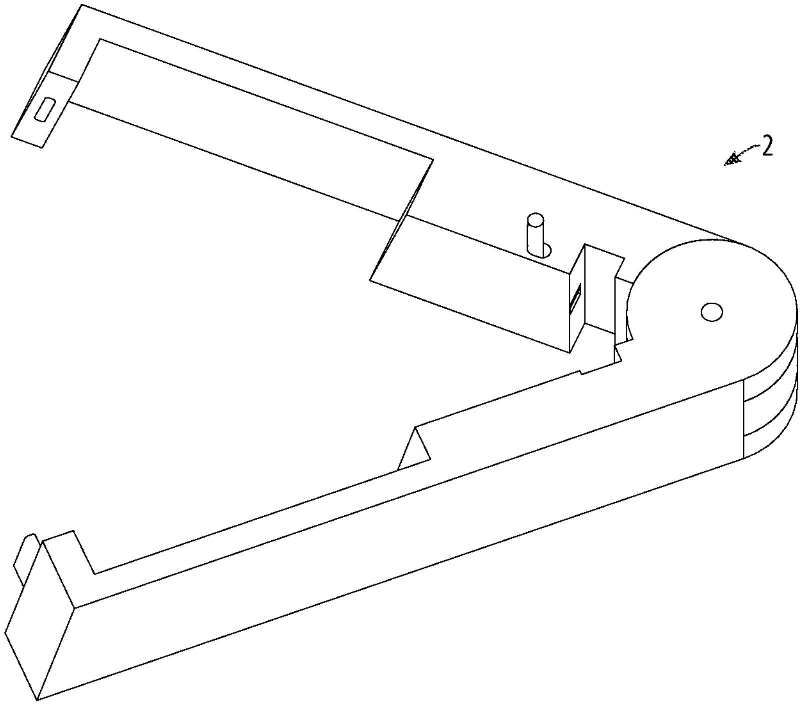
FIG. 4 is a perspective view of the clamp unit of the ladder multi-surface stabilizer of the invention, open with the pawl retracted.

Referring briefly to FIG. 3 and FIG. 4, the clamp unit 2 provides a pawl which engages with the teeth of the rack bar 1 in a ratcheting action which maintains an upward pulling force on the rack bar 1.

Figure 5:
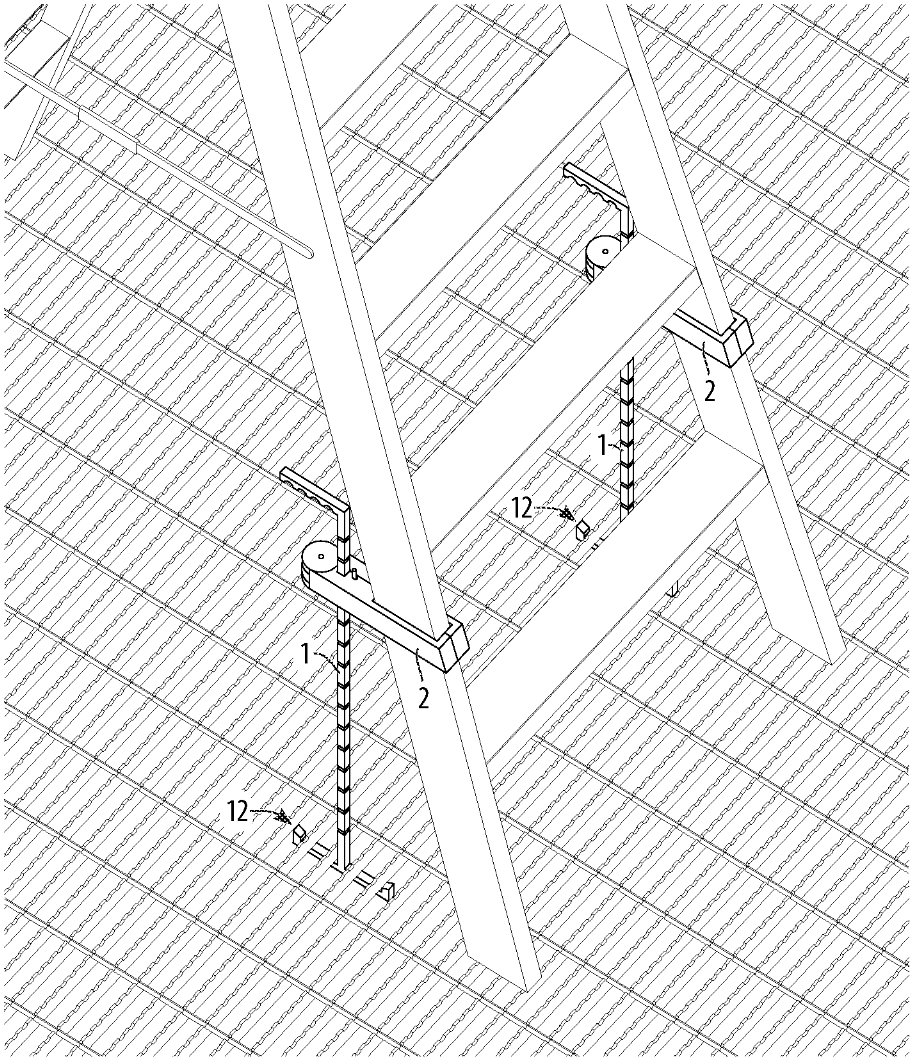
FIG. 5 is a perspective view of the ladder multi-surface stabilizer of the invention in use on a bar-grate decking surface, using only the crossbar.

Referring briefly to FIG. 5, when the ladder multi-surface stabilizer 10 is used on metal or fiberglass bar-grate decking, the crossbar 12 can be placed through the decking and can be pulled upward to brace against the underside of the decking.

The ladder multi-surface stabilizer 10 also provides anchor plates 3 and anchor units 4 to be used on a variety of surfaces other than bar-grate decking. Each anchor plate 3 provides a crossbar receptacle 32 for securely and removably mounting the crossbar 12 of the rack bar 1 to the anchor plate 3. The crossbar 12 of the rack bar 1 is mounted to the crossbar receptacle 32 of the anchor plate 3 in such a way that the rack bar 1 does not pull away from the anchor plate 3 in use, and the rack bar 1 and anchor plate 3 operate as an anchoring and bracing structure. Each anchor plate 3 also provides mounting holes 31 for securely and removably mounting anchor units 4 to the anchor plate 3. In the illustrated embodiment, the anchor plates 3 are of a substantially round shape, and each anchor plate 3 provides three mounting holes 31 to accommodate three anchor units 4. Such a configuration provides a substantial surface area without extending too far and possibly interfering with the ladder or other structures, and the triangular arrangement of the mounting holes 31 and anchor units 4 provide stability and better provide for placement away from obstacles, voids, or weak spots on the ground, floor, or deck surface. The anchor plate 3 can be made of steel or of a similar material.

Multiple types of anchor units 4 can be provided for optimal use on multiple types of surfaces. The anchor units 4 are interchangeable, allowing the same rack bars 1 and anchor plates 3 to be used on a variety of surfaces. The illustrated types of anchor units 3 are spike anchors 41, suction anchors 42, and magnet anchors 43. The anchor units 4 are securely, removably, and interchangeably mounted to the anchor plate 3 through the mounting holes 31 in such a way that the anchor plate 3 does not pull away from the anchor units 4, and the anchor units 4, the anchor plate 3, and the rack bar 1 operate as an anchoring and bracing structure.

Figure 6:
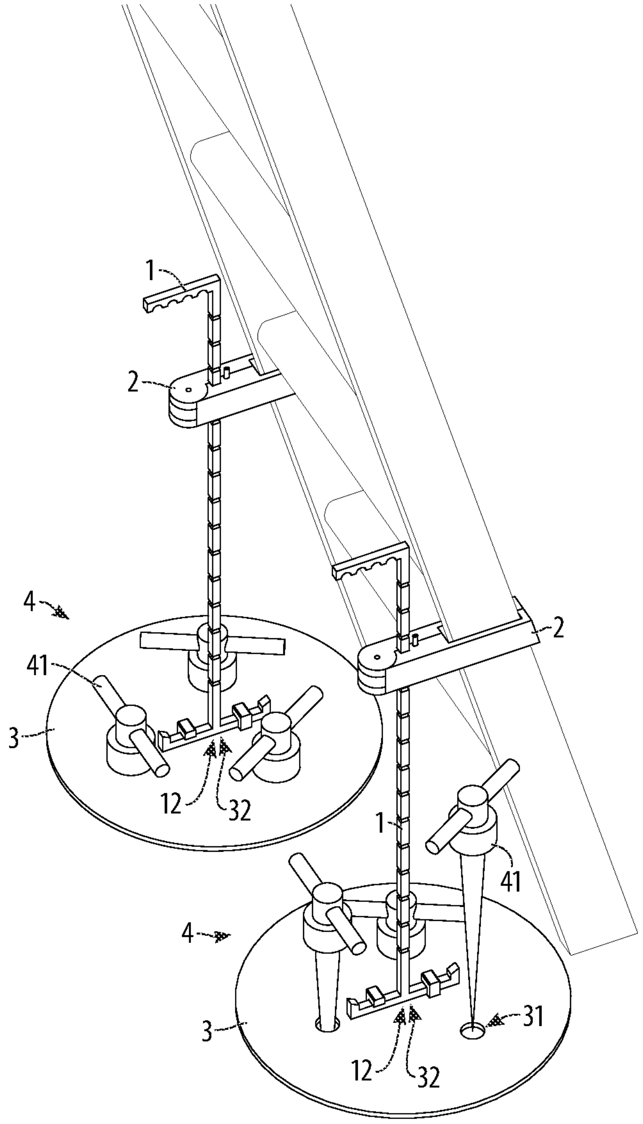
FIG. 6 is a perspective view of the ladder multi-surface stabilizer of the invention in use on a bare ground surface and using spike anchors.

Referring to FIG. 6, spike anchors 41 can be provided as anchor units 4 for use with the anchor plates 3. Spike anchors 41 are appropriate for use on bare ground or similar surfaces where driving spikes into the ground is possible and appropriate.

Figure 7:
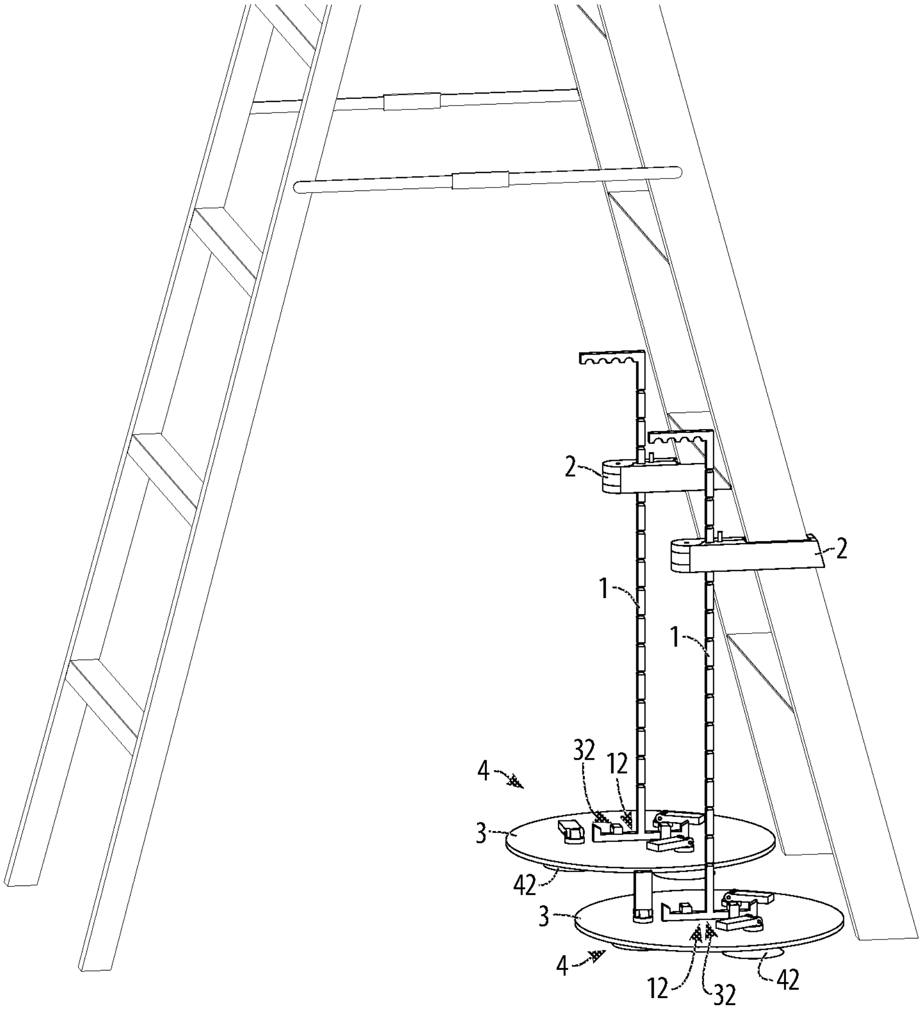
FIG. 7 is a perspective view of the ladder multi-surface stabilizer of the invention in use using suction anchors.

Referring to FIG. 7, suction anchors 42 can be provided as anchor units 4 for use with the anchor plates 3. Suction anchors 42 are appropriate for use on interior floors or on sufficiently smooth and non-porous exterior paving. If the flooring or paving is too rough or porous for efficient use of suction anchors 42, a separate mat or plate of smooth material can be placed on the surface and can be held securely in place by the weight of the ladder itself or by other means. As known in the relevant art, the suction anchor 42 can be provided with a toggle or lever mechanism to apply and release the suction force.

Figure 8:
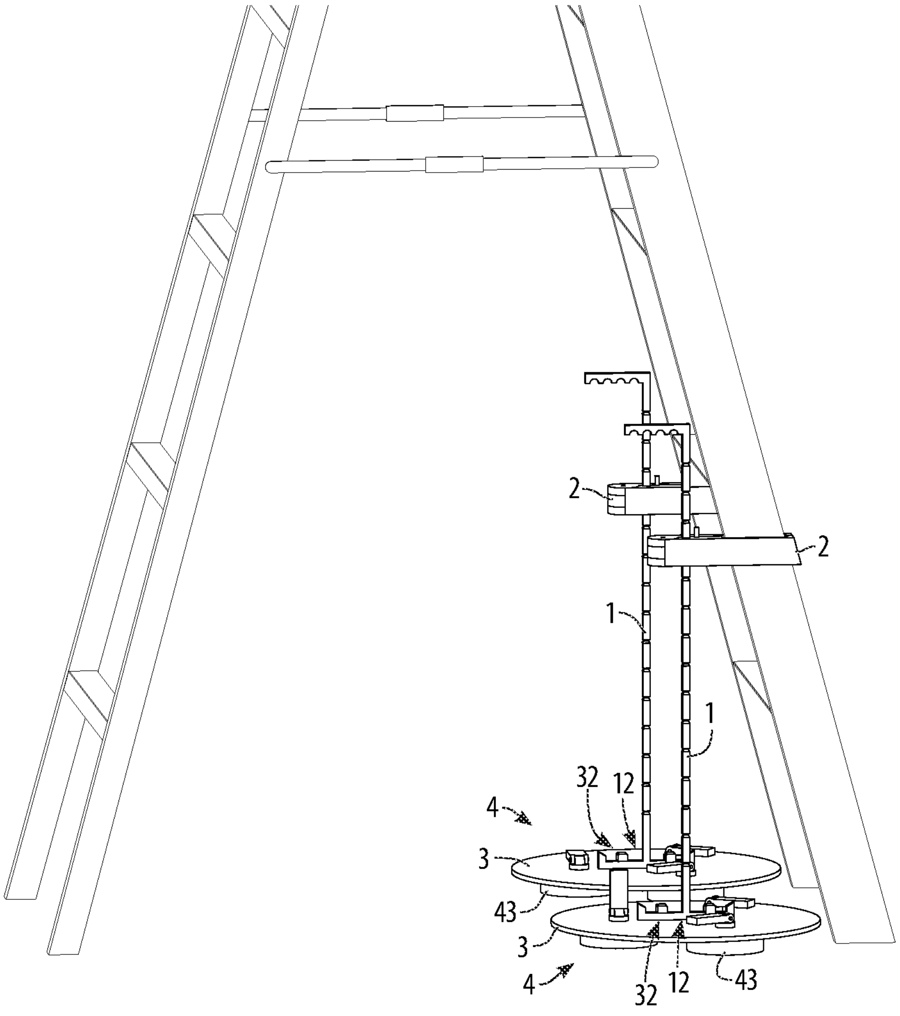
FIG. 8 is a perspective view of the ladder multi-surface stabilizer of the invention in use using magnet anchors.

Referring to FIG. 8, magnet anchors 43 can be provided as anchor units 4 for use with the anchor plates 3. Magnet anchors 43 are appropriate for use on steel and ferrous metal surfaces such as a ship's decking and similar maritime or industrial decking. Also, a separate steel plate can be placed on the surface and can be held securely in place by its own weight, the weight of the ladder, or by other means. As known in the relevant art, the magnet anchor 43 can be provided with a toggle or lever mechanism to apply and release the magnetic force.

Referring again to FIG. 1, the ladder multi-surface stabilizer 10 can be provided as a kit. The illustrated embodiment of the kit provides two rack bars 1, two clamp units 2, two anchor plates 3, six spike anchors 41, six suction anchors 42, and six magnet anchors 43. Such a kit would allow use of the ladder multi-surface stabilizer 10 on a wide variety of surfaces.

Many other changes and modifications can be made in the system and method of the present invention without departing from the spirit thereof. I therefore pray that my rights to the present invention be limited only by the scope of the appended claims.

I claim:

1. A ladder multi-surface stabilizer system for use with a standard ladder on a variety of surfaces, the ladder multi-surface stabilizer system comprising:
- (i) at least two rack bars, each providing a rack of teeth along a vertical bar and a crossbar at the bottom;
- (ii) at least two clamp units, each adapted for secure removable mounting to rails of the ladder, and each adapted to engage said teeth of said rack bar to maintain an upward pulling force on said rack bar;
- (iii) at least two anchor plates, each providing more than one mounting hole, and each providing a crossbar receptacle for secure removable mounting of said crossbar of said rack bar; and
- (iv) a plurality of anchor units, each adapted for secure removable interchangeable mounting to a said mounting hole of a said anchor plate.

2. The ladder multi-surface stabilizer system of claim 1, where said anchor units further comprise spike anchors.

3. The ladder multi-surface stabilizer system of claim 1, where said anchor units further comprise suction anchors.

4. The ladder multi-surface stabilizer system of claim 1, where said anchor units further comprise magnet anchors.

5. The ladder multi-surface stabilizer system of claim 1, where said anchor units further comprise more than one type of anchors.

6. The ladder multi-surface stabilizer system of claim 1, where said rack bars, clamp units, anchor plates, and anchor units are further provided as a kit.

7. A ladder multi-surface stabilizer system kit for use with a standard ladder on a variety of surfaces, the ladder multi-surface stabilizer system kit comprising:
- (i) two rack bars, each providing a rack of teeth along a vertical bar and a crossbar at the bottom;
- (ii) two clamp units, each adapted for secure removable mounting to rails of the ladder, and each adapted to engage said teeth of said rack bar to maintain an upward pulling force on said rack bar;
- (iii) two anchor plates, each providing more than one mounting hole, and each providing a crossbar receptacle for secure removable mounting of said crossbar of said rack bar; and
- (iv) a plurality of anchor units, each adapted for secure removable interchangeable mounting to a said mounting hole of a said anchor plate.

8. The ladder multi-surface stabilizer system kit of claim 7, where said anchor units further comprise six spike anchors.

9. The ladder multi-surface stabilizer system kit of claim 7, where said anchor units further comprise six suction anchors.

10. The ladder multi-surface stabilizer system kit of claim 7, where said anchor units further comprise six magnet anchors.

11. The ladder multi-surface stabilizer system kit of claim 7, where said anchor units further comprise more than one type of anchors.

12. The ladder multi-surface stabilizer system kit of claim 7, where said anchor units further comprise six spike anchors, six suction anchors, and six magnet anchors.

13. A ladder multi-surface stabilizer method for use with a standard ladder on a variety of surfaces, the ladder multi-surface stabilizer method comprising:
- (i) providing a ladder multi-surface stabilizer system comprising:
  - (a) at least two rack bars, each providing a rack of teeth along a vertical bar and a crossbar at the bottom;
  - (b) at least two clamp units, each adapted for secure removable mounting to rails of the ladder, and each adapted to engage said teeth of said rack bar to maintain an upward pulling force on said rack bar;
  - (c) at least two anchor plates, each providing more than one mounting hole, and each providing a crossbar receptacle for secure removable mounting of said crossbar of said rack bar; and
  - (d) a plurality of anchor units, each adapted for secure removable interchangeable mounting to a said mounting hole of a said anchor plate;
- (ii) choosing said anchor units appropriate for the surface;
- (iii) mounting said anchor units to said anchor plates;
- (iv) mounting said rack bars to said anchor plates;
- (v) mounting said rack bars in said clamp units;
- (vi) placing said anchor plates with said anchor units on the surface;
- (vii) removably securing said anchor units to the surface;
- (viii) mounting said clamp units to the rails of the ladder;
- (ix) pulling upward on said rack bars mounted in said clamp units, thereby engaging said teeth of said rack bar to maintain an upward pulling force; and
- (x) stabilizing the ladder on the surface for use.

* * * * *